(12) United States Patent
Cordes et al.

(10) Patent No.: US 11,529,000 B2
(45) Date of Patent: Dec. 20, 2022

(54) PASSENGER SEAT COMPRISING AN EXTENSIBLE SEAT ELEMENT, AND PASSENGER CABIN AREA

(71) Applicant: Airbus Operations GmbH, Hamburg (DE)

(72) Inventors: Frank Cordes, Hamburg (DE); Juergen Meister, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 572 days.

(21) Appl. No.: 16/495,941

(22) PCT Filed: Mar. 5, 2018

(86) PCT No.: PCT/EP2018/055305
§ 371 (c)(1),
(2) Date: Sep. 20, 2019

(87) PCT Pub. No.: WO2018/172046
PCT Pub. Date: Sep. 27, 2018

(65) Prior Publication Data
US 2020/0138202 A1 May 7, 2020

(30) Foreign Application Priority Data
Mar. 23, 2017 (DE) .................... 10 2017 204 894.8

(51) Int. Cl.
| | |
|---|---|
| *B60N 2/62* | (2006.01) |
| *A47C 31/12* | (2006.01) |
| *B64D 11/06* | (2006.01) |
| *B60N 2/24* | (2006.01) |
| *B60N 2/72* | (2006.01) |

(52) U.S. Cl.
CPC .............. *A47C 31/126* (2013.01); *B60N 2/62* (2013.01); *B64D 11/0639* (2014.12); *B60N 2/242* (2013.01); *B60N 2/72* (2013.01)

(58) Field of Classification Search
CPC ....................................... B60N 2/62
See application file for complete search history.

(56) References Cited

U.S. PATENT DOCUMENTS

| | | | |
|---|---|---|---|
| 5,435,623 A | 7/1995 | Kapec et al. | |
| 5,536,067 A * | 7/1996 | Pinto .............. | A47C 7/024 297/215.15 |

(Continued)

FOREIGN PATENT DOCUMENTS

| | | | | | |
|---|---|---|---|---|---|
| CN | 107791915 A | * | 3/2018 | ............... | B60N 2/62 |
| CN | 112238797 A | * | 1/2021 | ............... | B60N 2/06 |

(Continued)

OTHER PUBLICATIONS

International Search Report; priority document.
German Search Report; priority document.

*Primary Examiner* — Timothy J Brindley
(74) *Attorney, Agent, or Firm* — Greer, Burns & Crain, Ltd.

(57) ABSTRACT

A passenger seat comprises a backrest, a seat element and a size increasing mechanism which is configured to convert a weight acting on the seat element when a user sits in the passenger seat into an increase in the depth of a seat pan of the seat element that can be used by the user from a rest-position depth to a to an operational-position depth.

18 Claims, 6 Drawing Sheets

(56) References Cited

U.S. PATENT DOCUMENTS

| | | | |
|---|---|---|---|
| 5,984,411 A * | 11/1999 | Galumbeck | A47C 9/005 |
| | | | 297/DIG. 10 |
| 6,752,459 B2 * | 6/2004 | Deisig | A47C 7/024 |
| | | | 297/316 |
| 7,004,542 B2 | 2/2006 | Saint-Jaimes | |
| 7,083,146 B2 | 8/2006 | Hiesener | |
| 7,540,565 B2 * | 6/2009 | Lipford | A61G 5/14 |
| | | | 297/284.3 |
| 8,162,397 B2 | 4/2012 | Booth et al. | |
| 9,399,517 B2 * | 7/2016 | Guering | B64D 11/0639 |
| 9,492,339 B2 * | 11/2016 | Leib | A61G 7/10 |
| 10,780,003 B2 * | 9/2020 | Beyer | A47C 3/20 |
| 2004/0195450 A1 | 10/2004 | Hiesener | |
| 2009/0224584 A1 | 9/2009 | Lawall et al. | |
| 2009/0242700 A1 | 10/2009 | Raymond | |
| 2011/0006573 A1 | 1/2011 | Arakawa et al. | |
| 2015/0231991 A1 * | 8/2015 | Yetukuri | B60N 2/62 |
| | | | 297/284.11 |
| 2017/0158088 A1 * | 6/2017 | Pike | B60N 2/0228 |
| 2017/0291522 A1 * | 10/2017 | Line | B60N 2/0284 |
| 2019/0100117 A1 * | 4/2019 | Vanfossen | B60N 2/62 |
| 2020/0130537 A1 * | 4/2020 | Cordes | B64D 11/0639 |

FOREIGN PATENT DOCUMENTS

| | | |
|---|---|---|
| DE | 60300365 T2 | 4/2006 |
| DE | 102009050939 A1 | 6/2010 |
| DE | 102009043296 A1 | 4/2011 |
| DE | 102012111888 A1 | 6/2014 |
| DE | 102020121632 A1 * | 4/2021 |
| EP | 1452444 B1 | 9/2004 |
| FR | 2754496 A1 | 4/1998 |
| FR | 2882705 A1 | 9/2006 |
| GB | 2438090 A | 11/2007 |
| JP | 2012111362 A | 6/2012 |
| WO | 2009114304 A2 | 9/2009 |

\* cited by examiner

PASSENGER SEAT COMPRISING AN EXTENSIBLE SEAT ELEMENT, AND PASSENGER CABIN AREA

CROSS-REFERENCES TO RELATED APPLICATIONS

This application claims the benefit of the International Application No. PCT/EP2018/055305, filed on Mar. 5, 2018, and of the German patent application No. 10 2017 204 894.8 filed on Mar. 23, 2017, the entire disclosures of which are incorporated herein by way of reference.

FIELD OF THE INVENTION

The invention relates to a passenger seat which is suitable for use in the passenger cabin of an aircraft, but also for use in other means of transport, such as, for example, buses or trains. Furthermore, the invention relates to a passenger cabin area equipped with such a passenger seat.

BACKGROUND OF THE INVENTION

In modern means of transport, in particular in aircraft, the optimum use of the space available in a passenger cabin is of great economic importance. Seat rows arranged one behind another are therefore positioned at as small distances from one another as possible, in particular in economy class of an aircraft passenger cabin. However, in areas of an aircraft passenger cabin adjacent to emergency exits, transverse aisles have to be provided between seat rows arranged one behind another, the transverse aisles connecting a main aisle, which extends along a longitudinal axis of the aircraft passenger cabin, to the emergency exits, which are located, for example, above the wings. In order, in the event of an emergency evacuation, to enable a rapid flow of passengers to the emergency exits, the transverse aisles have to have a predetermined width of, for example, 13 inches. Accordingly, seat rows adjacent to the transverse aisles have to be arranged at a relatively far distance from one another.

EP 1 452 444 B1 or U.S. Pat. No. 7,083,146 B1 describes a seat row arrangement for a passenger cabin of a commercial aircraft with seat rows arranged one behind another, wherein the seat rows are arranged at predetermined seat distances. In the region of exits, a transverse aisle formed by an increased seat distance of the seat rows is provided to provide access to the exits. At least one seat row adjacent to the transverse aisle is provided with passenger seats having a seat part which can be folded upward, and therefore the width of the transverse aisle can be converted into a greater width by pivoting the corresponding seat part upward.

SUMMARY OF THE INVENTION

The invention is based on an object of providing a passenger seat which permits optimum use of the space available in the passenger cabin of an aircraft or another means of transport, while maintaining all safety requirements regarding dimensions of access to emergency exits. Furthermore, the invention is based on an object of specifying a passenger cabin area equipped with such a passenger seat.

A passenger seat comprises a backrest and a seat element. The backrest is preferably pivotable relative to the seat element between an upright position, in which a backrest surface of the backrest extends substantially perpendicular to a seat surface of the seat element, and a reclined position, in which the backrest surface of the backrest forms an angle greater than 90° with the seat surface of the seat element. The term "seat surface" refers here to a seat element surface which faces the backrest and on which a user of the passenger seat can sit in the customary manner The term "backrest surface" refers here to a front surface of the backrest, against which surface a user of the passenger seat can lean in the customary manner when the user sits on the seat surface of the seat element.

Furthermore, the passenger seat comprises an enlargement mechanism, which is designed to convert a weight acting on the seat element when a user sits on the passenger seat into an increase in a depth of a seat surface, usable by the user, of the seat element from an inoperative position depth into a use position depth. The term "depth" is understood here as meaning a dimension of the seat surface from a rear edge of the seat element facing the backrest as far as a front edge of the seat element facing away from the backrest. When the passenger seat is not in use and a weight does not act on the seat element, the seat element has the smaller inoperative position depth and consequently requires a smaller space than in an operating situation in which the passenger seat is in use. When the passenger seat is used and a user sitting on the seat element applies a weight to the seat element, the enlargement mechanism, by contrast, ensures an increase in the depth of the seat surface to the use position depth, and therefore the user can sit comfortably on the seat element, i.e., on the seat surface of the seat element.

When the passenger seat is installed in a passenger cabin of a means of transport, for example an aircraft, the front edge of the seat element in the unused state of the passenger seat is therefore at a greater distance from a front seat located in front of the passenger seat than in the used state of the passenger seat. The passenger seat can therefore be installed in an advantageous manner in a passenger cabin of a means of transport adjacent to a transverse aisle which provides access to further passenger seats arranged to the side of the passenger seat or to an exit, in particular an emergency exit of the passenger cabin. In particular, the passenger seat can be arranged adjacent to the transverse aisle in such a manner that the seat element of the passenger seat faces the aisle.

During normal operation of the means of transport, the passenger seat can then be used in the customary manner and without any loss of comfort for a passenger sitting on the passenger seat. When, by contrast, passengers have to pass through the transverse aisle to the passenger seats arranged to the side of the passenger seat or to the exit, the passenger seat can be taken out of use and the seat element brought again into its initial operating state with a reduced seat surface depth. The transverse aisle is thus widened, and therefore it is significantly easier and consequently quicker to pass through the transverse aisle. The passenger seat therefore permits optimum use of the space available in the passenger cabin. At the same time, all safety requirements for dimensions of access to exits, in particular emergency exits, can be maintained. Particularly advantageously, the passenger seat can be used in an aircraft passenger cabin adjacent to an emergency exit located above a wing, in order to ensure a predetermined aisle width of 13 inches.

In a preferred embodiment of the passenger seat, the enlargement mechanism is designed so as to convert a cessation of the weight acting on the seat element into a reduction in the depth of the seat surface, usable by the user, of the seat element from the use position depth into the inoperative position depth. Such a configuration of the passenger seat ensures that the depth of the seat surface and consequently the space required by the seat element are automatically reduced as soon as the passenger seat is no longer in use, i.e., as soon as a user sitting on the passenger seat stands up from the seat. Additional manual conversion measures for reducing the seat surface depth can thereby be omitted, and therefore the passenger seat can be brought particularly rapidly and simply into an operating state in which the seat element has a reduced space requirement and additional free space is thereby created, for example in a transverse aisle adjacent to the passenger seat.

The passenger seat can furthermore comprise a seat element carrier. The seat element carrier can be fastenable, for example, to a substructure which, for its part, is fastenable in a seat rail provided in a floor of a passenger cabin of a means of transport. The seat element of the passenger seat is preferably fastened to the seat element carrier so as to be pivotable about a pivot axis relative to the seat element carrier between an inoperative position and a use position. The pivot axis is preferably arranged in the region of a front edge of the seat element carrier facing away from the backrest. In particular, the seat element can be connected via the pivot axis to the seat element carrier in such a manner that a rear edge of the seat element facing the backrest is pivotable freely relative to the seat element carrier and consequently also relative to the backrest.

When the seat element is in its inoperative position, the seat surface of the seat element forms, in particular, an angle of 5 to 60°, preferably an angle of 10 to 30° and particularly preferably an angle of 10 to 20°, with a carrier surface of the seat element carrier, the carrier surface facing the seat element. In other words, in the inoperative position of the seat element, the seat surface of the seat element is inclined relative to the carrier surface of the seat element carrier, and therefore the seat element in its inoperative position has a reduced space requirement forward in a direction perpendicular to the backrest surface of the backrest. As a result, in the unused state of the passenger seat, the distance between the front edge of the seat element and a front seat located in front of the passenger seat can be increased further. When the seat element is in its use position, the seat surface of the seat element by contrast preferably extends substantially parallel to the carrier surface of the seat element carrier, the carrier surface facing the seat element, and/or substantially perpendicular to the backrest surface of the backrest if the backrest is in an upright position. It is thereby ensured that a user can sit comfortably on the passenger seat.

In principle, it is conceivable that the seat element is fastened to the seat element carrier so as to be pivotable about the pivot axis in such a manner that, in the inoperative position of the seat element, the seat surface of the seat element is inclined downward proceeding from the front edge of the seat element carrier in the direction of the backrest. However, the seat element is preferably fastened to the seat element carrier so as to be pivotable about the pivot axis in such a manner that, in the inoperative position of the seat element, the seat surface of the seat element rises upward proceeding from the front edge of the seat element carrier in the direction of the backrest, i.e., forms a forwardly sloping surface, as viewed from the backrest.

In a preferred embodiment, the passenger seat furthermore comprises a pretensioning mechanism which is designed to pretension the seat element into its inoperative position. By equipping the passenger seat with a pretensioning mechanism, it is ensured that the seat element is automatically transferred into its inoperative position, in which the seat element has a reduced space requirement, when the passenger seat is not in use. In particular, the pretensioning mechanism is designed to force the seat element into an inoperative position in which the seat surface of the seat element is inclined upward proceeding from the front edge of the seat element carrier in the direction of the backrest. The pretensioning mechanism is then preferably dimensioned in such a manner that the pretensioning force which it applies is lower than the weight which a user of the passenger seat applies to the seat element when the user sits down on the passenger seat or sits on the passenger seat. As a result, it is ensured that the seat element can be transferred in a simple manner into its use position and held in its use position when a user sits down on the passenger seat or sits on the passenger seat.

In a preferred embodiment, the pretensioning mechanism comprises a spring element which can comprise a first end and a second end. The first end of the spring element can be supported on the carrier surface of the seat element carrier. By contrast, the second end of the spring element can be supported on a lower side of the seat element, the lower side facing the carrier surface of the seat element carrier.

In a particularly preferred embodiment, the passenger seat furthermore comprises a gear mechanism which is designed to convert a pivoting movement of the seat element about the pivot axis into an activation or deactivation of the enlargement mechanism. In particular, the gear mechanism is designed to convert a pivoting movement of the seat element about the pivot axis from its inoperative position into its use position into an activation of the enlargement mechanism. As a result, the passenger seat can be operated particularly comfortably since the application of a weight to the seat element when the passenger seat is put into use automatically brings about an activation of the enlargement mechanism without the user having to take further measures for increasing the seat surface depth of the seat element from the inoperative position depth to the use position depth.

Furthermore, the gear mechanism can be designed to convert a pivoting movement of the seat element about the pivot axis from its use position into its inoperative position into a deactivation of the enlargement mechanism. The effect achieved by this is that the seat surface depth of the seat element is automatically reduced again from the use position depth to the inoperative position depth as soon as a user of the passenger seat stands up from the passenger seat.

The enlargement mechanism of the passenger seat preferably comprises an extension element which forms a first portion of the seat element and is adjustable between an inoperative position and a use position. When the extension element is in its inoperative position, an extension surface of the extension element is arranged curved or inclined relative to a seat surface portion of a second portion of the seat element, which portion is adjacent to the extension element, or parallel to the seat surface portion of the second portion of the seat element below or above the seat surface portion of the second portion of the seat element. When, by contrast, the extension element is in its use position, the extension surface of the extension element is aligned with the seat surface portion of the second portion of the seat element and thereby brings about an expansion or extension of the seat surface portion of the second portion of the seat element about the extension surface of the extension element. The overall seat surface of the seat element thereby obtains a size which is comfortable for a user of the passenger seat. The extension element is preferably arranged relative to the second portion of the seat element in such a manner that it forwardly extends the seat surface of the seat element in the region of a front edge of the seat element, the front edge facing away from the backrest of the passenger seat.

The extension element can be designed, for example, in the form of a FinRay® effect component fastened to the second portion of the seat element. A FinRay® effect component is a bionic component which displays what is referred to as the FinRay® effect, i.e., when a compressive force is applied to the component, arches counter to the direction of the compressive force. An extension element designed in the form of a FinRay® effect component has an extension surface which is arched relative to the seat surface portion of the second portion of the seat element and consequently has a smaller dimension in a direction parallel to the seat surface portion of the second portion of the seat element from the backrest of the passenger seat for as long as a compressive force acts on the component. If, by contrast, the compressive force acting on the component ceases, the component "stretches", and therefore the extension surface of the extension element ensures an effective increase in the depth of the seat surface of the seat element from the inoperative position depth to the use position depth.

Alternatively thereto, the extension element can also be designed in the form of a pivot element which is pivotable about a further pivot axis relative to the second portion of the seat element. In the inoperative position of the extension element, the extension surface of the extension element is then inclined relative to the seat surface portion of the second portion of the seat element, as a result of which the seat surface of the seat element overall obtains a smaller depth, i.e., the inoperative position depth. If, by contrast, the extension element designed in the form of a pivot element is in its use position, the extension surface of the extension element aligned with the seat surface portion of the second portion of the seat element extends the overall seat surface of the seat element to the use position depth.

Finally, the extension element can also be designed in the form of a telescopic element which is displaceable telescopically relative to the second portion of the seat element. In such a configuration of the extension element, in the inoperative position of the extension element, the extension surface of the extension element is arranged parallel to the seat surface portion of the second portion of the seat element below or above the seat surface portion of the second portion of the seat element, as a result of which the overall seat surface of the seat element is shortened to the inoperative position depth. By contrast, in the use position of the extension element, the extension surface of the extension element aligned with the seat surface portion of the second portion of the seat element in turn extends the overall seat surface of the seat element to the use position depth.

The gear mechanism of the passenger seat can comprise a pressure element which is movable between an activation position and a deactivation position. When the pressure element is in its activation position, the pressure element applies a compressive force to an extension element, which is designed in the form of a FinRay® effect component, as a result of which the extension element is held in its inoperative position. When, by contrast, the pressure element is in its deactivation position, the pressure element releases the extension element, which is designed in the form of a FinRay® effect component, as a result of which a movement, induced by the FinRay® effect, of the extension element into its use position is made possible. The pressure element can be designed, for example, in the form of a pin which is rotatable about an axis of rotation and, in its activation position, applies a compressive force to a lower side of the extension element, the lower side facing away from the extension surface of the extension element.

Furthermore, the gear mechanism can comprise a drive device for moving the pressure element between its activation position and its deactivation position. The drive device can, for example, comprise a first gearwheel which is connected to the pivot axis for rotation therewith and is in engagement with a second gearwheel which is connected to the pressure element for rotation therewith. A pivoting of the seat element between its inoperative position and its use position about the pivot axis then brings about a rotation of the first gearwheel and consequently also a rotation of the second gearwheel which is in engagement with the first gearwheel. If desired or required, the first and the second gearwheel can be correspondingly dimensioned in order to realize a multiplication of a comparatively small pivoting movement of the seat element about the pivot axis into a correspondingly greater rotation movement of the pressure element about its axis of rotation.

Alternatively thereto, the drive device can also comprise a cable pull which is connected to the pressure element and is configured to apply a tensile force to the pressure element in order to move the pressure element from its activation position into its deactivation position. The cable pull can comprise, for example, a holding element which can extend from a lower side of the seat element, the lower side facing the carrier surface of the seat element carrier. A first end of a cable can be fastened to the holding element, the second end of which cable can be connected to the pressure element which is rotatable about an axis of rotation. Furthermore, the cable pull can comprise a contact element with which the cable comes into contact when the seat element is pivoted about the pivot axis from its inoperative position into its use position. The contact element can be attached, for example, to the seat element carrier. By interaction of the cable with the contact element, a tensile force is generated in the cable, by means of which tensile force the pressure element is rotated about its axis of rotation from its activation position into its deactivation position. In such a configuration of the drive device, the pressure element is preferably pretensioned into its activation position, and therefore the pressure element is automatically moved back from its deactivation position into its activation position as soon as the cable pull no longer exerts a tensile force on the pressure element.

In a further embodiment, the gear mechanism can comprise an actuating lever which is movable between an activation position and a deactivation position. The actuating lever of the gear mechanism is preferably connected to an extension element, which is designed in the form of a pivot element which is pivotable about a further pivot axis, in such a manner that a movement of the actuating lever from its deactivation position into its activation position is converted into a pivoting movement of the extension element about the further pivot axis in order to pivot the extension element from its inoperative position into its use position. In its activation position, the actuating lever can apply a force to the extension element, the force being suitable, i.e., being correspondingly dimensioned and directed, to hold the extension element in its use position. The force applied to the extension element by the actuating lever can be, for example, a compressive force applied to a lower side of the extension element.

By contrast, when the actuating lever is arranged in its deactivation position, a pivoting of the extension element into its inoperative position is made possible or is induced. For example, the actuating lever arranged in its deactivation position can release the extension element such that an extension element pretensioned resiliently into its inoperative position can move back automatically from its use position into its inoperative position. Alternatively thereto, however, the actuating lever can also be connected to the extension element in such a manner that the actuating lever carries along the extension element during a movement from its activation position into its deactivation position and thereby induces a pivoting of the extension element from its use position into its inoperative position.

The actuating lever can be connected via a kinematic element, which is rotatable about an axis of rotation, to a further lever, which is fastened to the seat element, in such a manner that a pivoting movement of the seat element about the pivot axis is transmitted via the further lever and the kinematic element to the actuating lever in order to move the actuating lever between its activation position and its deactivation position. The further lever can be fastened rigidly, for example at a first end, to the lower side of the seat element, the lower side facing the carrier surface of the seat element carrier. By contrast, at a second end, the further lever can be connected rotatably to the kinematic element, and therefore the further lever converts a pivoting movement of the seat element about the pivot axis into a rotational movement of the kinematic element about the axis of rotation. The rotational movement, for its part, can be transmitted to the actuating lever which can be connected at a first end to the kinematic element and at a second end to the extension element. In particular, the second end of the actuating lever can be connected to the extension element in the region of a lower side of the extension element, the lower side facing the carrier surface of the seat element carrier, when the extension element for increasing the seat surface of the seat element is in its use position.

In yet another embodiment, the gear mechanism can comprise a lever arrangement which is movable between an activation position and a deactivation position. The lever arrangement of the gear mechanism is preferably connected to an extension element, which is designed in the form of a telescopic element which is displaceable telescopically relative to the second portion of the seat element, in such a manner that a movement of the lever arrangement from its deactivation position into its activation position is converted into a displacement telescopically of the extension element relative to the second portion of the seat element in order to displace the extension element from its inoperative position into its use position. In its activation position, the lever arrangement can apply a force to the extension element, the force being suitable, i.e., being correspondingly dimensioned and directed, to hold the extension element in its use position. The force applied by the lever arrangement to the extension element can be, for example, a compressive force applied to an actuating surface of the extension element, the actuating surface facing the second portion of the seat element.

By contrast, when the lever arrangement is arranged in its deactivation position, a displacement of the extension element into its inoperative position is made possible or is induced. For example, the lever arrangement arranged in its deactivation position can release the extension element, and therefore an extension element which is pretensioned resiliently into its inoperative position can be moved back automatically from its use position into its inoperative position. However, as an alternative thereto, the lever arrangement can also be connected to the extension element in such a manner that the lever arrangement carries along the extension element during a movement from its activation position into its deactivation position and thereby induces a displacement of the extension element from its use position into its inoperative position.

The gear mechanism can furthermore comprise a drive device for moving the lever arrangement between its activation position and its deactivation position. The drive device can comprise, for example, a cable pull which is connected to the lever arrangement and is designed to apply a tensile force to the lever arrangement in order to move the lever arrangement from its deactivation position into its activation position. The cable pull can comprise, for example, a holding element which can be fastened to the backrest of the passenger seat, for example to a side surface of the backrest. A first end of a cable can be fastened to the holding element, the second end of which cable can be connected to the lever arrangement. Furthermore, the cable pull can comprise a contact element with which the cable comes into contact when the seat element is pivoted about the pivot axis from its inoperative position into its use position. The contact element can be attached, for example, in the region of an edge facing the backrest, to the second portion of the seat element. By means of the interaction of the cable with the contact element, a tensile force is generated in the cable, by means of which tensile force the lever arrangement is moved from its deactivation position into its activation position. In such a configuration of the drive device, the lever arrangement is preferably pretensioned into its deactivation position, and therefore the lever arrangement is automatically moved back from its activation position into its deactivation position as soon as the cable pull no longer exerts a tensile force on the lever arrangement.

The lever arrangement can comprise at least one lever with a first and a second end. The first end of the lever is preferably connected to the cable pull while the second end of the lever is preferably connected to the actuating surface of the extension element. For example, the second end of the lever can lie against an actuating surface of the extension element, which actuating surface is formed by a surface of the extension element, the surface facing the second portion of the seat element. In a preferred embodiment, the lever arrangement comprises two levers which, in the deactivation position of the lever arrangement, extend in substantially opposed directions from the cable pull. By means of the configuration of the lever arrangement with two levers, force is transmitted from the lever arrangement to the extension element, i.e., the actuating surface of the extension element, at two points, as a result of which a uniform movement of the extension element between its inoperative position and its use position is made possible.

The passenger seat preferably furthermore comprises a locking mechanism which is designed in order, in a locked state, to deactivate the enlargement mechanism. In particular, the locking mechanism can be designed in order, in a locked state, to prevent a pivoting movement of the seat element about the pivot axis. By equipping the passenger seat with a locking mechanism, an unintentional actuation of the enlargement mechanism and in particular an unintentional pivoting movement of the seat element about the pivot axis can be prevented. The locking mechanism can comprise, for example, a bolt which, in the locked state of the locking mechanism, is in engagement with the seat element carrier and with the second portion of the seat element in order to prevent a pivoting movement of the seat element about the pivot axis. Furthermore, the locking mechanism can comprise an actuating button which can be attached, for example, to the second portion of the seat element or to the seat element carrier and which can be actuated manually by a user in order to unlock the locking mechanism.

In a particularly preferred embodiment, the locking mechanism is pretensioned into its locked state and is designed to automatically deactivate the enlargement mechanism as soon as the enlargement mechanism has been deactivated again after an activation. In particular, the locking mechanism can be pretensioned into its locked state in such a manner that the locking mechanism automatically prevents a pivoting movement of the seat element about the pivot axis as soon as the seat element has reached its inoperative position again proceeding from its use position. Such a configuration of the locking mechanism means that an active actuation of the locking mechanism after a deactivation of the enlargement mechanism or pivoting of the seat element into its inoperative position is unnecessary.

Finally, the passenger seat can comprise a seat cushion which is arranged on the seat surface of the seat element. The seat cushion is preferably elastically deformable, i.e., for example, is formed from an elastically deformable fabric or from another suitable elastically deformable material in order to ensure that the seat cushion is not damaged upon activation of the enlargement mechanism and a resulting increase in the depth of the seat surface, usable by the user, of the seat element from the inoperative position depth into the use position depth.

A passenger cabin area comprises a main aisle which extends substantially parallel to a longitudinal axis of the passenger cabin area. Furthermore, the passenger cabin area comprises an exit and a transverse aisle branching off from the main aisle. At least one above-described passenger seat is arranged in the passenger cabin area adjacent to the transverse aisle in such a manner that the seat element of the passenger seat faces the transverse aisle. In such a passenger cabin area, the transverse aisle can be widened by the enlargement mechanism being deactivated, and therefore the depth of the seat surface, usable by the user, of the seat element of the passenger seat merely corresponds to the inoperative position depth.

The transverse aisle can be a transverse aisle running between passenger seat rows arranged one behind another. The passenger seat can then advantageously be installed, for example, as an "aisle seat", placed adjacent to the main aisle, in the passenger cabin area in order via the transverse aisle to facilitate access to passenger seats installed to the side of the passenger seat as a "middle seat" and/or "window seat". In a particularly preferred embodiment of the passenger cabin area, the transverse aisle connects the main aisle to an exit, in particular an emergency exit of the passenger cabin area.

The above-described passenger seat and/or the above-described passenger cabin area are/is suitable in particular for use in an aircraft. The passenger cabin area can be in particular an aircraft passenger cabin area with a transverse aisle which connects the main aisle to an emergency exit located above a wing, and in which a predetermined transverse aisle width of 13 inches has to be ensured.

BRIEF DESCRIPTION OF THE DRAWINGS

Preferred embodiments of the invention will now be explained in more detail with reference to the attached schematic drawings, of which

DETAILED DESCRIPTION OF THE PREFERRED EMBODIMENTS

Figure 1:
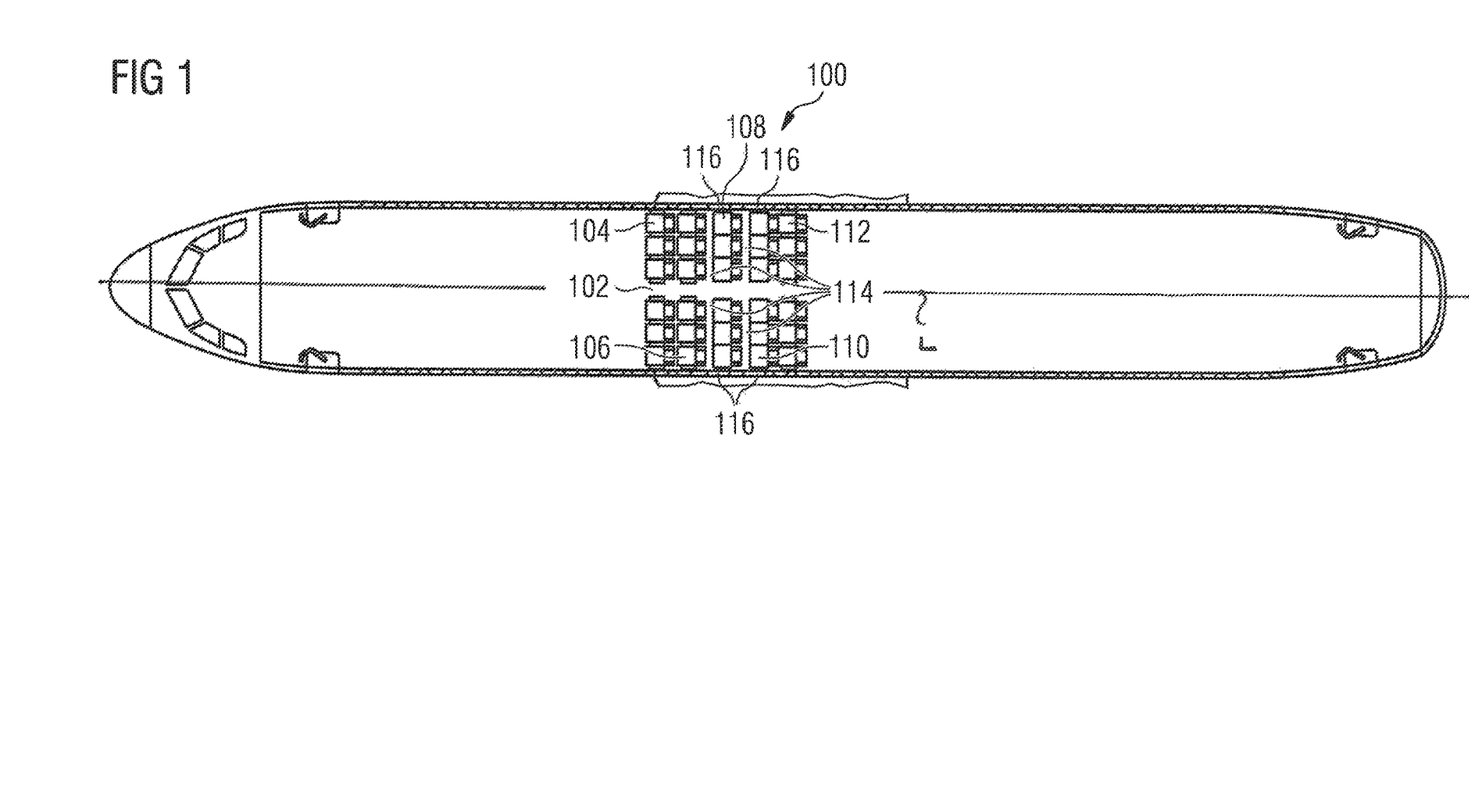
FIG. 1 shows a passenger cabin area in which a plurality of passenger seats are arranged.

FIG. 1 shows a passenger cabin area 100 which, in the exemplary embodiment shown here, forms part of an aircraft passenger cabin. The passenger cabin area 100 comprises a main aisle 102 which extends substantially parallel to a longitudinal axis L of the passenger cabin area 100. A plurality of passenger seat rows 104, 106, 108, 110, 112 are installed in the passenger cabin area 100. Transverse aisles 114 which connect the main aisle 102 to emergency exits 116 are in each case provided between the passenger seat rows 106 and 108 and the passenger seat rows 108 and 110. In the exemplary embodiment of an aircraft passenger cabin area 100 that is shown in FIG. 1, the emergency exits 116 are placed above the wings of the aircraft.

The transverse aisles 114 have to have a predetermined width in order, in the event of an emergency evacuation of the aircraft passenger cabin, to be able to ensure a sufficient flow of passengers through the transverse aisles 114 to the emergency exits 116. For this reason, in the arrangement according to FIG. 1, the distance between consecutively arranged passenger seats of the passenger seat rows 106 and 108 and between consecutively arranged passenger seats of the passenger seat rows 108 and 110 is in each case greater than the distance between consecutively arranged passenger seats of the passenger seat rows 104 and 106 and consecutively arranged passenger seats of the passenger seat rows 110 and 112.

Various embodiments of a passenger seat 10 suitable for installation in the passenger seat rows 106 and 108 of the passenger cabin area 100 shown in FIG. 1 are illustrated in FIGS. 2 to 10. Additionally or alternatively thereto, the passenger seats 10 shown in FIGS. 2 to 10 are also suitable for installation in the passenger seat rows 104, 110 and 112 as "aisle seats" adjacent to the main aisle 102 and/or as "middle seats" in order, as will be explained in more detail below, to facilitate access to the "window seats".

Figure 2:
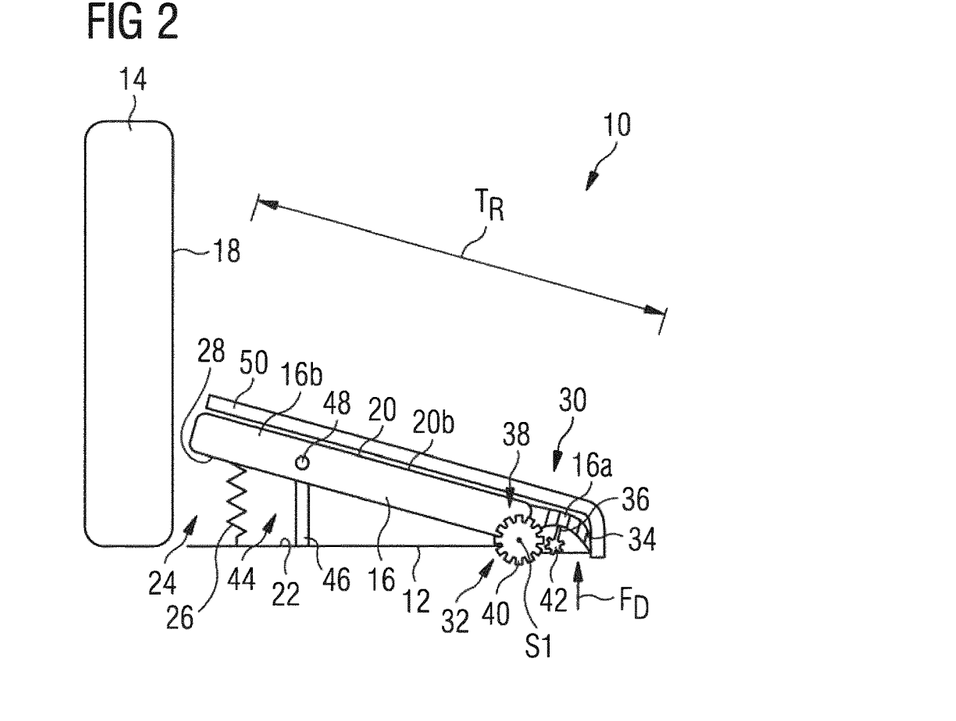
FIG. 2 shows a side view of a passenger seat suitable for installation in the passenger cabin area according to FIG. 1 with a seat element arranged in an inoperative position and the enlargement mechanism deactivated.
Figure 3:
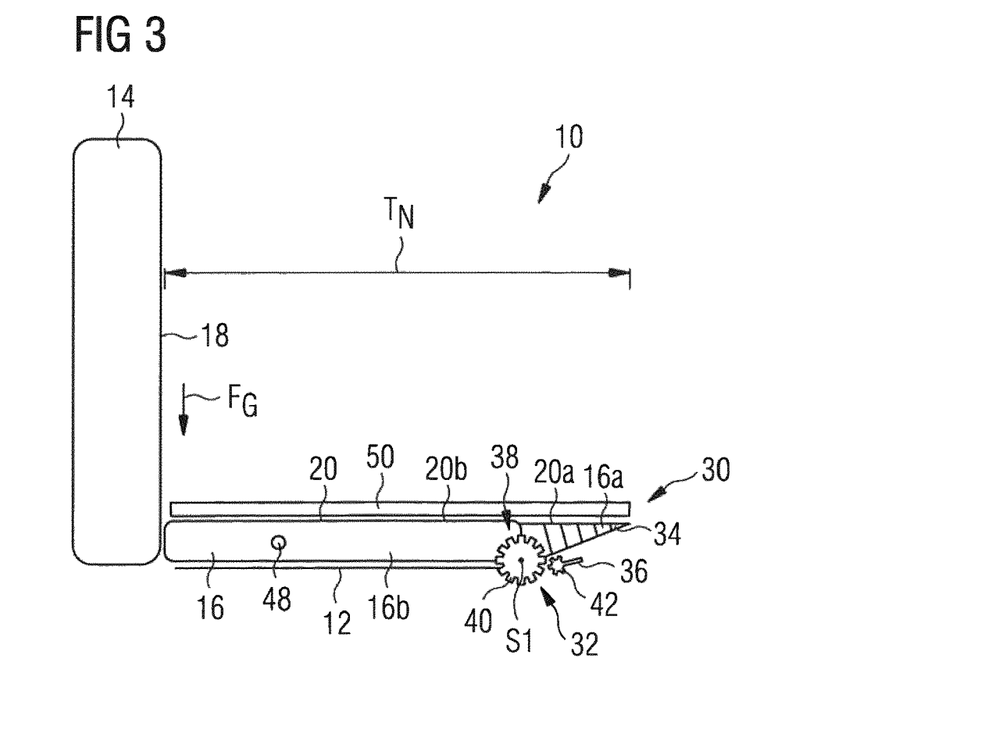
FIG. 3 shows a side view of the passenger seat according to FIG. 2 with a seat element arranged in a use position and the enlargement mechanism activated.

In an embodiment shown in FIGS. 2 and 3, the passenger seat 10 comprises a seat element carrier 12 which is fastenable to a substructure (not shown in the figures). The substructure is, for its part, fastenable in a seat rail (likewise not shown) which can be integrated in a floor of the passenger cabin area 100. Furthermore, the passenger seat 10 comprises a backrest 14 and a seat element 16. The backrest 14 is pivotable relative to the seat element 16 between an upright position and a reclined position. When the backrest 14 is in its upright position, a backrest surface 18 of the backrest 14 extends substantially perpendicularly to a seat surface 20 of the seat element 16. In contrast thereto, the backrest surface 18 of the backrest 14 forms an angle greater than 90° with the seat surface 20 of the seat element 16 when the backrest 14 is in its reclined position. If desired, the backrest 14, however, can also be formed rigidly, i.e., so as not to be rotatable relative to the seat element 16.

As will become clear from a comparison of FIGS. 2 and 3, the seat element 16 of the passenger seat 10 is fastened to the seat element carrier 12 so as to be pivotable about a pivot axis S1 relative to the seat element carrier 12 between an inoperative position, illustrated in FIG. 2, and a use position, shown in FIG. 3. The pivot axis S1 is arranged in the region of a front edge of the seat element carrier 12 facing away from the backrest 14, and therefore a rear edge of the seat element 16 facing the backrest 14 is pivotable freely relative to the seat element carrier 12 and the backrest 14. When the seat element 16 is in its inoperative position, the seat surface 20 of the seat element 16 rises upward proceeding from the front edge of the seat element carrier 12 in the direction of the backrest 14, i.e., forms a forwardly sloping surface, as viewed from the backrest 14. In the variants of a passenger seat 10 shown in the figures, the seat surface 20 of the seat element 16 forms herein an angle a of approx. 15° with a carrier surface 22 of the seat element carrier 12 facing the seat element 16. When the seat element 16, as shown in FIG. 3, is in its use position, the seat surface 20 of the seat element 16 by contrast extends substantially parallel to the carrier surface 22 of the seat element carrier 12 facing the seat element 16.

The passenger seat 10 is equipped with a pretensioning mechanism 24 which serves to pretension the seat element 16 into its inoperative position shown in FIG. 2. The pretensioning mechanism 24 comprises a spring element 26 with a first end and a second end. The first end of the spring element 26 is supported on the carrier surface 22 of the seat element carrier 12 while the second end of the spring element 26 is supported on a lower side 28 of the seat element 16, the lower side facing the carrier surface 22 of the seat element carrier 12. The spring element 26 is dimensioned in such a manner that the pretensioning force applied by the spring element 26 is smaller than a weight FG which a user of the passenger seat 10 applies to the seat element 16, i.e., to the seat surface 20 of the seat element 16, when the user sits down on the passenger seat 10 or sits on the passenger seat 10. The pretensioning force applied by the pretensioning mechanism 24 or the spring element 26 is of a sufficient size, however, to ensure that the seat element 16 is automatically moved back from its use position, illustrated in FIG. 3, into its inoperative position shown in FIG. 2, as soon as the user stands up from the passenger seat 10, i.e., the weight FG acting on the seat surface 20 of the seat element 16 ceases.

Furthermore, the passenger seat 10 comprises an enlargement mechanism 30 which is designed to convert the weight FG acting on the seat element when a user sits on the passenger seat 10 into an increase in a depth of the seat surface 20, usable by the user, of the seat element 16 from an inoperative position depth TR into a use position depth TN. When the passenger seat 10 is not in use, as shown in FIG. 2, and no weight FG acts on the seat element 16, the seat element 16 has the inoperative position depth TR. When, by contrast, the passenger seat 10 is used and a user sitting on the seat element 16 applies a weight FG to the seat element 16, the enlargement mechanism 30 ensures an increase in the depth of the seat surface 20 to the use position depth TN. As will be explained in more detail below, the enlargement mechanism 30 is furthermore designed to convert a cessation of the weight FG acting on the seat element 16 into a reduction in the depth of the seat surface 20, usable by the user, of the seat element 16 from the use position depth TN into the inoperative position depth TR.

The passenger seat 10 is furthermore equipped with a gear mechanism 32 which is designed to convert a pivoting movement of the seat element 16 about the pivot axis S1 into an activation or deactivation of the enlargement mechanism 30. In particular, the gear mechanism 32 is designed to convert a pivoting movement of the seat element 16 about the pivot axis S1 from its inoperative position, shown in FIG. 2, into its use position, illustrated in FIG. 3, into an activation of the enlargement mechanism 30. Furthermore, the gear mechanism 32 is designed to convert a pivoting movement of the seat element 16 about the pivot axis S1 from its use position, shown in FIG. 3, into its inoperative position, illustrated in FIG. 2, into a deactivation of the enlargement mechanism 30.

The enlargement mechanism 30 comprises an extension element 34 which forms a first portion 16a of the seat element 16. The extension element 34 is adjustable between an inoperative position, shown in FIG. 2, and a use position, illustrated in FIG. 3. When the extension element 34 is in its inoperative position, an extension surface 20a of the extension element 34 is curved relative to a seat surface portion 20b of a second portion 16b of the seat element 16, which portion is adjacent to the extension element 34. When, by contrast, the extension element 34 is in its use position, the extension surface 20a of the extension element 34 is aligned with the seat surface portion 20b of the second portion 16b of the seat element 16 and thereby brings about an expansion or extension of the seat surface portion 20b of the second portion 16b of the seat element 16 by the extension surface 20a of the extension element 34 in the region of a front edge of the seat element 16 facing away from the backrest 14 of the passenger seat 10.

In the variant of the passenger seat 10 that is shown in FIGS. 2 and 3, the extension element 34 is designed in the form of a FinRay® effect component fastened to the second portion 16b of the seat element 16 and has an extension surface 20a which is arched relative to the seat surface portion 20b of the second portion 16b of the seat element 16 in the direction of the seat element carrier 12 for as long as a compressive force FD acts on the component. If, by contrast, the compressive force FD acting on the component ceases, the component "stretches", and therefore the extension surface 20a of the extension element 34 ensures an effective increase in the depth of the seat surface 20 of the seat element 16 from the inoperative position depth TR to the use position depth TN.

In order to activate or deactivate the extension element 34 designed in the form of a FinRay® effect component, the gear mechanism 32, in the case of the embodiment of the passenger seat 10 that is shown in FIGS. 2 and 3, comprises a pressure element 36 which is movable between an activation position, which is shown in FIG. 2, and a deactivation position, illustrated in FIG. 3. In particular, the pressure element 36 is designed in the form of a pin which is rotatable about an axis of rotation and, in its activation position, applies a compressive force FD to a lower side of the extension element 34, the lower side facing away from the extension surface 20a of the extension element 34.

Furthermore, the gear mechanism 32 comprises a drive device 38 for moving the pressure element 36 between its activation position and its deactivation position. The drive device 38 comprises a first gearwheel 40 which is connected to the pivot axis S1 for rotation therewith and is in engagement with a second gearwheel 42 which is connected to the pressure element 36 for rotation therewith. A pivoting of the seat element 16 from its inoperative position, illustrated in FIG. 2, into its use position, shown in FIG. 3, about the pivot axis S1 brings about a rotation of the first gearwheel 40 in the counterclockwise direction and consequently a rotation of the second gearwheel 42, which is in engagement with the first gearwheel 40, in the clockwise direction. In a corresponding manner, a pivoting of the seat element 16 from its use position, shown in FIG. 3, into its inoperative position, illustrated in FIG. 2, about the pivot axis S1 brings about a rotation of the first gearwheel 40 in the clockwise direction and consequently a rotation of the second gearwheel 42, which is in engagement with the first gearwheel 40, in the clockwise direction. The first gearwheel 40 is of such a larger size than the second gearwheel 42 that a multiplication of the comparatively small pivoting movement of the seat element 16 about the pivot axis S1 into a correspondingly larger rotational movement of the pressure element 36 about its axis of rotation can be realized.

The passenger seat 10 furthermore comprises a locking mechanism 44 which is designed in order, in a locked state, to prevent a pivoting movement of the seat element 16 about the pivot axis S1 and thereby to deactivate the enlargement mechanism 30. The locking mechanism 44 comprises a bolt 46 which, in the locked state of the locking mechanism 44, is in engagement with the seat element carrier 12 and the second portion 16b of the seat element 16 in order to prevent a pivoting movement of the seat element 16 about the pivot axis S1. Furthermore, the locking mechanism 44 comprises an actuating button 48 which is attached to the second portion 16b of the seat element 16 and which can be actuated manually by a user in order to release the bolt 46 from its locking position and thereby to unlock the locking mechanism 44. The locking mechanism 44 is pretensioned into its locked state, and therefore it automatically prevents a pivoting movement of the seat element 16 about the pivot axis S1 as soon as the seat element 16 has reached its inoperative position again proceeding from its use position.

Finally, the passenger seat 10 comprises a seat cushion 50 which is arranged on the seat surface 20 of the seat element 16. The seat cushion 50 is elastically deformable, i.e., is formed from an elastically deformable fabric or from another suitable elastically deformable material, in order to ensure that the seat cushion 50 is not damaged upon an activation of the enlargement mechanism 30 and a resulting increase in the depth of the seat surface 20, usable by the user, of the seat element 16 from the inoperative position depth into the use position depth.

The function of the embodiment of the passenger seat 10 that is shown in FIGS. 2 and 3 will be explained below. When the passenger seat 10, as shown in FIG. 2, is not in use and no weight FG acts on the seat element 16, the seat element 16 is in its inoperative position in which the seat surface 20 of the seat element 16 is inclined relative to the carrier surface 22 of the seat element carrier 12. Furthermore, the interaction of the pressure element 36 with the extension element 34 of the enlargement mechanism 30 ensures that the enlargement mechanism 30 is deactivated and the seat element 16 consequently merely has its inoperative position depth TR. Accordingly, the seat element 16 requires little space forward in a direction perpendicular to the backrest surface 18 of the backrest 14, as a result of which, in the unused state of the passenger seat 10, the distance between the front edge of the seat element 16 and a front seat located in front of the passenger seat 10 can be increased. The locking mechanism 44 locks the seat element 16 in its inoperative position, as a result of which an unintentional transfer of the seat element 16 from its inoperative position into its use position and a resulting activation of the enlargement mechanism 30 are reliably prevented.

When a user wishes to sit down on the passenger seat 10, the user first of all presses the actuating button 48 of the locking mechanism 44 in order to unlock the locking mechanism 44. Subsequently, the weight FG applied to the seat element 16 by the user overcomes the pretensioning force applied by the spring element 26 of the pretensioning mechanism 24 and brings about a pivoting movement of the seat element 16 about the pivot axis S1. As a result, the seat surface 20 of the seat element 16 is oriented substantially parallel to the carrier surface 22 of the seat element carrier.

At the same time, the gear mechanism 32 converts the pivoting movement of the seat element 16 about the pivot axis S1 from its inoperative position into its use position into an activation of the enlargement mechanism 30. In particular, the pivoting movement of the seat element 16 about the pivot axis S1 from its inoperative position into its use position induces a rotation of the first gearwheel 40 in the counterclockwise direction and consequently a rotation of the second gearwheel 42 in the clockwise direction, as a result of which the pressure element 36 releases the extension element 34. By means of the FinRay® effect, the cessation of the compressive force FD brings about stretching of the extension element 34, and therefore the extension surface 20a of the extension element 34 ensures an effective increase in the depth of the seat surface 20 of the seat element 16 from the inoperative position depth TR to the use position depth TN, in conjunction with a corresponding elastic extension of the seat cushion 50. The seat surface 20 of the seat element 16 thereby obtains a depth which permits comfortable sitting.

When the user stands up again from the passenger seat 10 and consequently the weight FG no longer acts on the seat element 16, the pretensioning mechanism 24 ensures that the seat element 16 is automatically pivoted back into its inoperative position. The pivoting movement of the seat element 16 is transmitted in turn via the gear mechanism 32 to the enlargement mechanism 30, i.e., the enlargement mechanism 30 is also automatically deactivated. In particular, a rotation of the first gearwheel 40 in the clockwise direction, resulting from the pivoting movement of the seat element 16 about the pivot axis S1, brings about a rotation of the second gearwheel 42 in the counterclockwise direction, as a result of which the pressure element 36 comes again into contact with the lower side of the extension element 34. As a result of the FinRay® effect, the extension element 34 arches counter to the compressive force FD applied by the pressure element 36, from which, in turn, a reduction in the depth of the seat surface 20 of the seat element 16 to the inoperative position depth TR results. Furthermore, the pretensioning of the locking mechanism 44 causes the latter to resume its locking position again.

When the passenger seat 10 is installed in the passenger cabin area 100 in the passenger seat rows 106 and 108 adjacent to the transverse aisles 114 in such a manner that the seat element 16 of the passenger seat 10 faces the respective transverse aisle 114, the distance between the front edge of the seat element 16 and a further passenger seat located in front of the passenger seat 10 can be increased by pivoting the seat element 16 from its use position into its inoperative position and the simultaneous deactivation of the enlargement mechanism 30. During the normal operation of an aircraft equipped with the passenger cabin area 100, the passenger seat 10 with the seat element 16 arranged in its use position can be used in the customary manner and without losses of comfort for a passenger sitting on the passenger seat 10. When, by contrast, passengers have to pass through the transverse aisle 114 to the exit 116, the seat element 16 can be pivoted into its inoperative position and at the same time the enlargement mechanism 30 can be deactivated, as a result of which the transverse aisle 114 can be widened.

Figure 4:
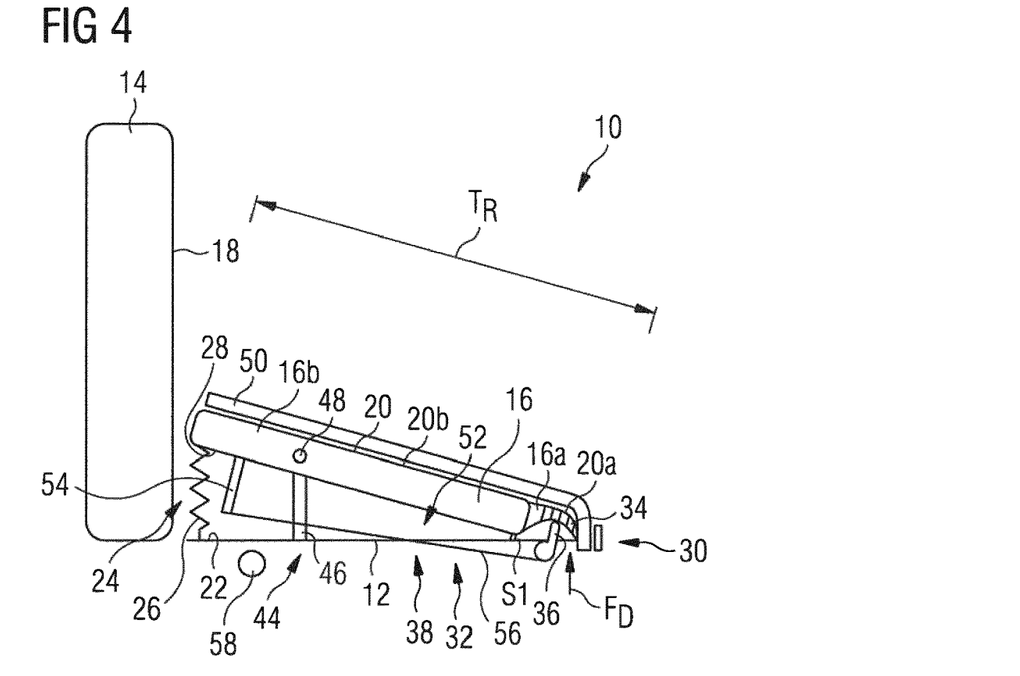
FIG. 4 shows a side view of a further passenger seat suitable for installation in the passenger cabin area according to FIG. 1 with a seat element arranged in an inoperative position and the enlargement mechanism deactivated.
Figure 5:
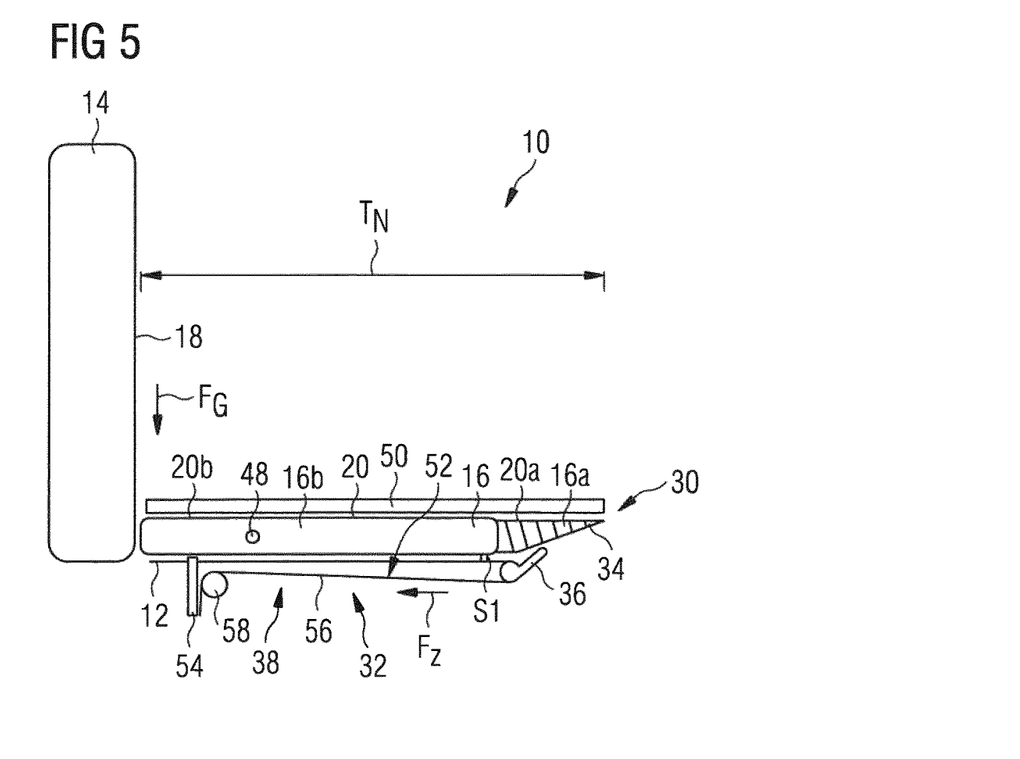
FIG. 5 shows a side view of the passenger seat according to FIG. 4 with a seat element arranged in a use position and the enlargement mechanism activated.

The embodiment of a passenger seat 10 that is shown in FIGS. 4 and 5 differs from the arrangement according to FIGS. 2 and 3 merely by the configuration of the drive device 38 of the gear mechanism 32. In the case of the passenger seat 10 illustrated in FIGS. 4 and 5, the drive device 38 comprises a cable pull 52 which is connected to the pressure element 36 and is designed to apply a tensile force FZ to the pressure element 36 for moving the pressure element 36 from its activation position, shown in FIG. 4, into its deactivation position, illustrated in FIG. 5.

The cable pull 52 comprises a holding element 54 which extends from the lower side 28 of the seat element 16. A first end of a cable 56 is fastened to the holding element 54. A second end of the cable is, by contrast, connected to the pressure element 36 which is rotatable about an axis of rotation. Finally, the cable pull 52 comprises a contact element 58 which is attached to the seat element carrier 12 and with which the cable 56 comes into contact when the seat element 16 is pivoted about the pivot axis S1 from its inoperative position, illustrated in FIG. 4, into its use position, shown in FIG. 5. By means of the interaction of the cable 56 with the contact element 58, the tensile force FZ is generated in the cable 56, by means of which tensile force the pressure element 36 is rotated about its axis of rotation from its activation position into its deactivation position. The pressure element 36 is pretensioned into its activation position, and therefore the pressure element 36 is automatically moved back from its deactivation position into its activation position as soon as the cable pull 52 no longer exerts a tensile force on the pressure element 36 as a result of a return movement of the seat element 16 from its use position into its inoperative position.

Otherwise, the structure and the function of the passenger seat 10 according to FIGS. 4 and 5 correspond to the structure of the function of the passenger seat 10 illustrated in FIGS. 2 and 3.

Figure 6:
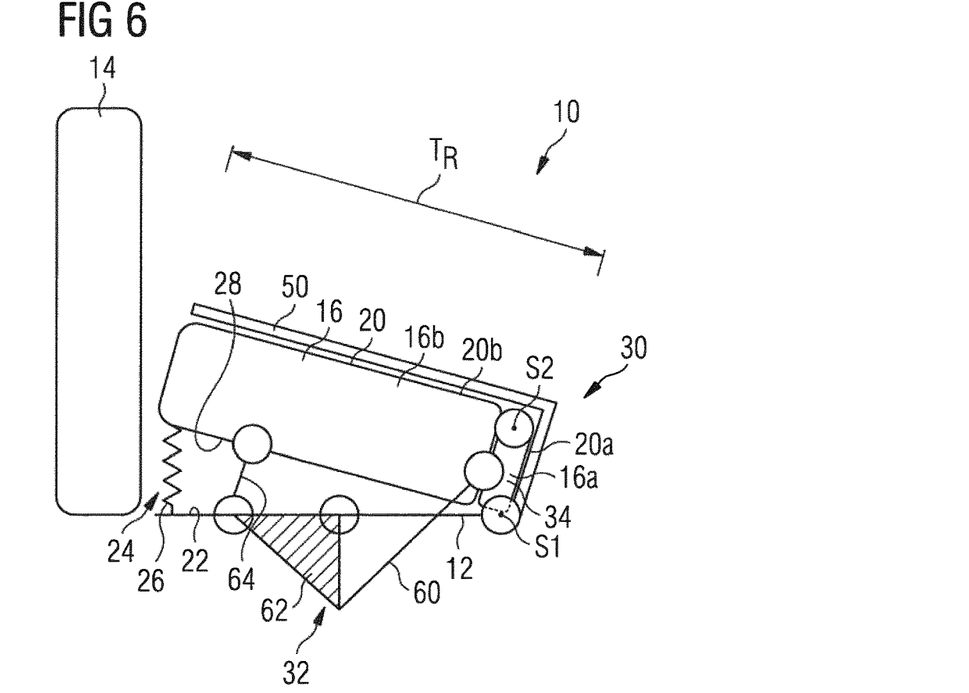
FIG. 6 shows a side view of a further passenger seat suitable for installation in the passenger cabin area according to FIG. 1 with a seat element arranged in an inoperative position and the enlargement mechanism deactivated.
Figure 7:
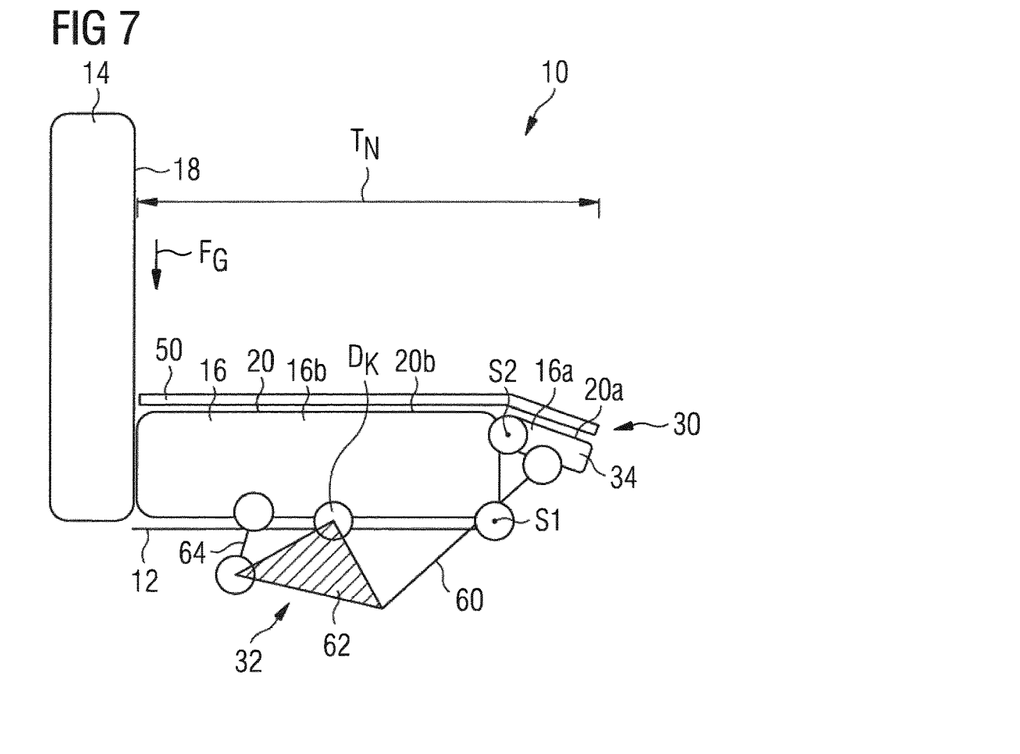
FIG. 7 shows a side view of the passenger seat according to FIG. 6 with a seat element arranged in a use position and the enlargement mechanism activated.

The embodiment of a passenger seat 10 that is shown in FIGS. 6 and 7 differs from the arrangement according to FIGS. 2 and 3 first of all in that the extension element 34 is designed in the form of a pivot element which is pivotable about a further pivot axis S2 relative to the second portion 16b. In the inoperative position of the extension element 34, the extension surface 20a of the extension element 34 is inclined relative to the seat surface portion 20b of the second portion 16b of the seat element 16, as a result of which the seat surface 20 of the seat element 16 overall obtains a smaller depth, i.e., the inoperative position depth TR. When, by contrast, the extension element 34 which is designed in the form of a pivot element is in its use position, the extension surface 20a of the extension element 34 aligned with the seat surface portion 20b of the second portion 16b of the seat element 16 extends the overall seat surface 20 of the seat element 16 to the use position depth TN.

The gear mechanism 32 interacting with the extension element 34 which is designed in the form of a pivot element which is pivotable about a further pivot axis S2 relative to the second portion 16b, comprises an actuating lever 60 which is movable between an activation position, see FIG. 6, and a deactivation position, see FIG. 7. The actuating lever 60 is connected to the extension element 34 in such a manner that a movement of the actuating lever 60 from its deactivation position into its activation position is converted into a pivoting movement of the extension element 34 about the further pivot axis S2 in order to pivot the extension element 34 from its inoperative position into its use position. In its activation position, the actuating lever 60 applies a compressive force to a lower side of the extension element 34, the compressive force holding the extension element 34 in its use position. During a movement from its activation position, illustrated in FIG. 6, into its deactivation position, shown in FIG. 7, the actuating lever 60 carries along the extension element 34 and thereby induces a pivoting of the extension element 34 from its use position into its inoperative position.

The actuating lever 60 is connected via a kinematic element 62, which is rotatable about an axis of rotation DK, to a further lever 64, which is fastened to the seat element 16, in such a manner that a pivoting movement of the seat element 16 about the pivot axis S1 is transmitted via the further lever 64 and the kinematic element 62 to the actuating lever 60 in order to move the actuating lever 60 between its activation position and its deactivation position. The further lever 64 is fastened rigidly at a first end to the lower side 28 of the seat element 16. By contrast, at a second end, the further lever 64 is connected rotatably to the kinematic element 62, and therefore the further lever 64 converts a pivoting movement of the seat element 16 about the pivot axis S1 into a rotational movement of the kinematic element 62 about the axis of rotation DK. The rotational movement can be transmitted for its part to the actuating lever 60 which is connected at a first end to the kinematic element 62 and at a second end to the extension element 34.

Otherwise, the structure and the function of the passenger seat 10 according to FIGS. 6 and 7 correspond to the structure and the function of the passenger seat 10 illustrated in FIGS. 2 and 3.

Figure 8:
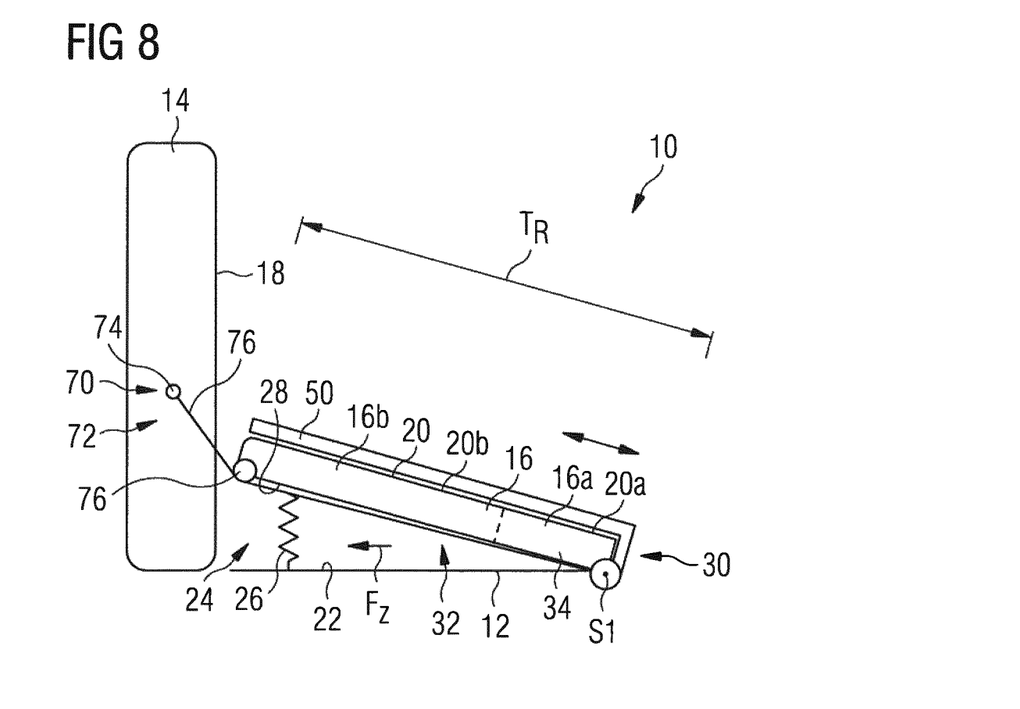
FIG. 8 shows a side view of a further passenger seat suitable for installation in the passenger cabin area according to FIG. 1 with a seat element arranged in an inoperative position and the enlargement mechanism deactivated.
Figure 9:
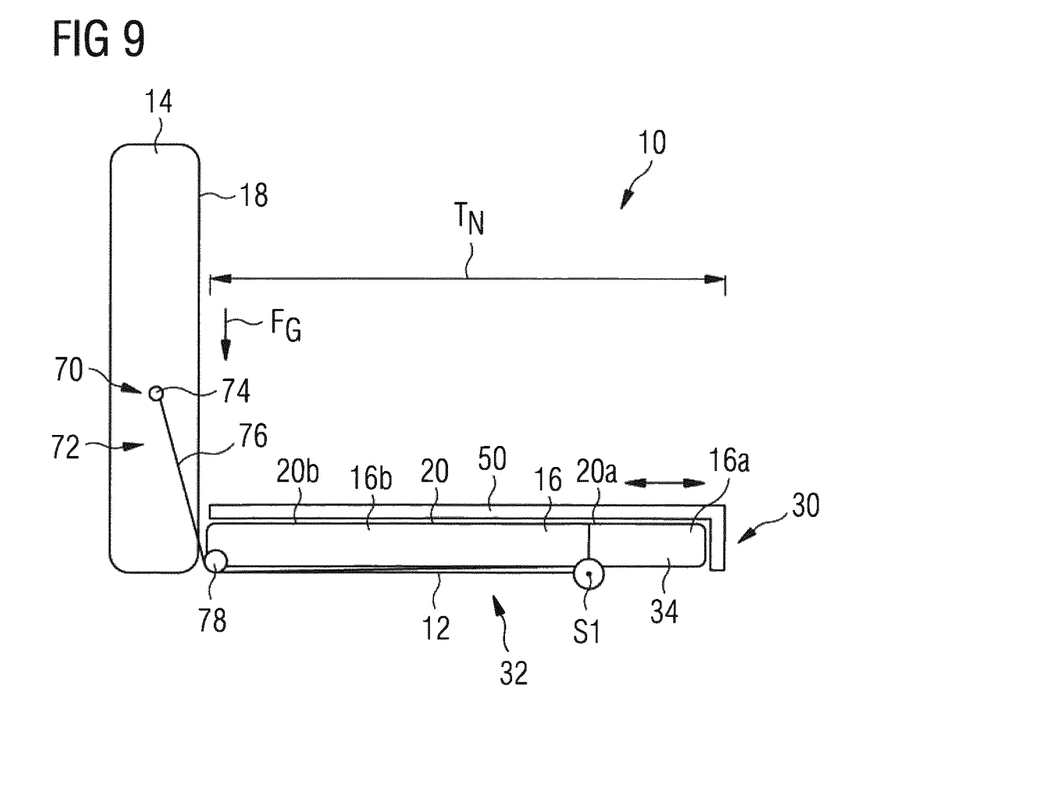
FIG. 9 shows a side view of the passenger seat according to FIG. 8 with a seat element arranged in a use position and with the enlargement mechanism activated.
Figure 10:
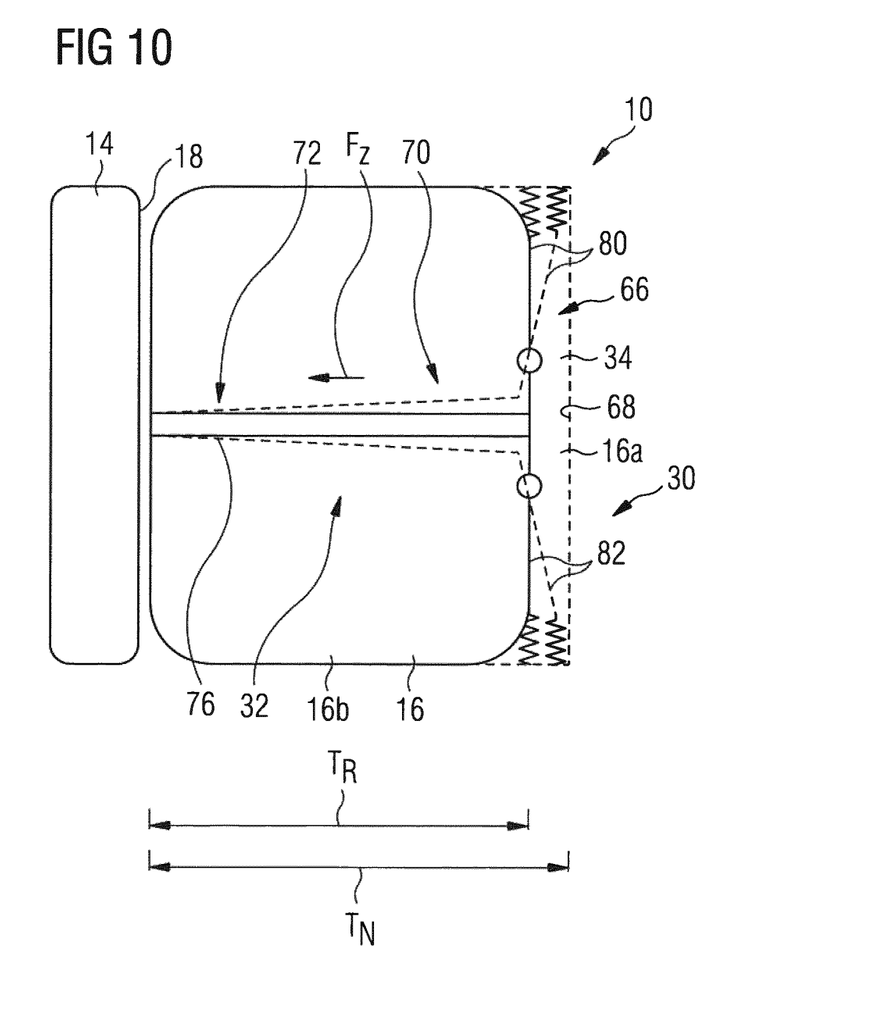
FIG. 10 shows a top view of the passenger seat according to FIGS. 8 and 9.

The embodiment of a passenger seat 10 that is shown in FIGS. 8 to 10 differs from the arrangement according to FIGS. 2 and 3 in that the extension element 34 is designed in the form of a telescopic element which is displaceable telescopically relative to the second portion 16b of the seat element 16. In the inoperative position of the extension element 34 that is shown in FIG. 8 and indicated by solid lines in FIG. 10, the extension surface 20a of the extension element is arranged parallel to the seat surface portion 20b of the second portion 16b of the seat element 16 below the seat surface portion 20b of the second portion 16b of the seat element 16, as a result of which the overall seat surface 20 of the seat element 16 is shortened to the inoperative position depth TR. By contrast, in the use position of the extension element 34 that is shown in FIG. 9 and is indicated by dashed lines in FIG. 10, the extension surface 20a of the extension element 34 aligned with the seat surface portion 20b of the second portion 16b of the seat element 16 extends the overall seat surface 20 of the seat element 16 in turn to the use position depth TN.

The gear mechanism 32 comprises a lever arrangement 66 which is movable between an activation position and a deactivation position. The lever arrangement 66 is connected to the extension element 34 in such a manner that a movement of the lever arrangement 66 from its deactivation position into its activation position is converted into a displacement telescopically of the extension element 34 relative to the second portion 16b of the seat element 16 in order to displace the extension element 34 from its inoperative position into its use position. In its activation position, the lever arrangement 66 applies a compressive force to an actuating surface 68 of the extension element 34 facing the second portion 16b of the seat element 16, by means of which compressive force the extension element 34 is held in its use position. When the lever arrangement 66 is moved from its activation position into its deactivation position, the lever arrangement 66 carries along the extension element 34, as a result of which a displacement of the extension element 34 from its use position into its inoperative position is induced.

A drive device 70 for moving the lever arrangement 66 between its activation position and its deactivation position comprises a cable pull 72 which is connected to the lever arrangement 66 and applies a tensile force FZ to the lever arrangement 66 for moving the lever arrangement 66 from its deactivation position into its activation position. The cable pull 72 comprises a holding element 74 which is fastened to a side surface of the backrest 14. A first end of a cable 76 is fastened to the holding element 74, the second end of which cable is connected to the lever arrangement 66. Furthermore, the cable pull 72 comprises a contact element 78 with which the cable 76 comes into contact when the seat element 16 is pivoted about the pivot axis S1 from its inoperative position into its use position. The contact element 78 is attached to the second portion 16b of the seat element 16 in the region of an edge facing the backrest 14. By means of the interaction of the cable 76 with the contact element 78, a tensile force FZ is generated in the cable 76, by means of which tensile force the lever arrangement 66 is moved from its deactivation position into its activation position. The lever arrangement 66 is pretensioned into its deactivation position, and therefore the lever arrangement 66 is automatically moved back out of its activation position into its deactivation position as soon as the cable pull 72 no longer exerts a tensile force FZ on the lever arrangement 66.

In the arrangement shown in FIGS. 8 to 10, the lever arrangement 66 comprises two levers 80, 82, each having a first and a second end. The first end of each lever 80, 82 is connected to the cable pull 72 while the second end of the levers 80, 82 is connected to the actuating surface 68 of the extension element 34. In particular, the second end of the levers 80, 82 lies against the actuating surface 68 of the extension element 34. In the deactivation position of the lever arrangement 66, the two levers 80, 82 extend in substantially opposite directions from the cable pull 72. By contrast, in the activation position of the lever arrangement 66, the two levers 80, 82 enclose an angle <180°.

Otherwise, the structure and the function of the passenger seat 10 according to FIGS. 8 to 10 correspond to the structure and the function of the passenger seat 10 illustrated in FIGS. 2 and 3.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A passenger seat, comprising:
a backrest,
a seat element,
an enlargement mechanism, which is configured to convert a weight acting on the seat element when a user sits on the passenger seat into an increase in a depth of a seat surface, usable by the user, of the seat element from an inoperative position depth into a use position depth, and,
a seat element carrier, wherein the seat element is fastened to the seat element carrier so as to be pivotable about a pivot axis, which is arranged in a region of a front edge of the seat element carrier facing away from the backrest, relative to the seat element carrier between an inoperative position, in which the seat surface of the seat element forms an angle of 5 to 60° with a carrier surface of the seat element carrier, said carrier surface facing the seat element, and a use position, in which the seat surface of the seat element extends parallel to the carrier surface of the seat element carrier, said carrier surface facing the seat element.

2. The passenger seat as claimed in claim 1, wherein the enlargement mechanism is configured to convert a cessation of the weight acting on the seat element into a reduction in the depth of the seat surface, usable by the user, of the seat element from the use position depth into the inoperative position depth.

3. The passenger seat as claimed in claim 1, which furthermore comprises a pretensioning mechanism which is configured to pretension the seat element into the inoperative position, wherein the pretensioning mechanism comprises a spring element, a first end of which is supported on the carrier surface of the seat element carrier and a second end of which is supported on a lower side of the seat element, said lower side facing the carrier surface of the seat element carrier.

4. The passenger seat as claimed in claim which furthermore comprises a gear mechanism which is configured to convert a pivoting movement of the seat element about the pivot axis into an activation or deactivation of the enlargement mechanism.

5. The passenger seat as claimed in claim 1, wherein the enlargement mechanism comprises an extension element which forms a first portion of the seat element and is adjustable between an inoperative position, in which an extension surface of the extension element is curved or inclined relative to a seat surface portion of a second portion of the seat element, which portion is adjacent to the extension element or is arranged parallel to the seat surface portion of the second portion of the seat element below or above the seat surface portion of the second portion of the seat element, and a use position, in which the extension surface of the extension element is aligned with the seat surface portion of the second portion of the seat element.

6. The passenger seat as claimed in claim 5, wherein the extension element is configured in the form of a component configured to arch counter to a direction of a compressive force applied to the component, the component fastened to the second portion of the seat element, a pivot element which is pivotable about a pivot axis relative to the second portion of the seat element or a telescopic element which is displaceable telescopically relative to the second portion of the seat element.

7. The passenger seat as claimed in claim 4,
wherein the enlargement mechanism comprises an extension element which forms a first portion of the seat element and is adjustable between an inoperative position, in which an extension surface of the extension element is curved or inclined relative to a seat surface portion of a second portion of the seat element, which portion is adjacent to the extension element or is arranged parallel to the seat surface portion of the second portion of the seat element below or above the seat surface portion of the second portion of the seat element, and a use position, in which the extension surface of the extension element is aligned with the seat surface portion of the second portion of the seat element,
wherein the extension element is configured in the form of a component configured to arch counter to a direction of a compressive force applied to the component, the component fastened to the second portion of the seat element, a pivot element which is pivotable about a further pivot axis relative to the second portion of the seat element or a telescopic element which is displaceable telescopically relative to the second portion of the seat element.

8. The passenger seat as claimed in claim 7, wherein the gear mechanism comprises a pressure element which is movable between an activation position, in which the pressure element applies compressive force to the extension element, and thereby holds same in the inoperative position, and a deactivation position, in which the pressure element releases the extension element, and thereby permits a movement of the extension element into the use position.

9. The passenger seat as claimed in claim 8, wherein the gear mechanism furthermore comprises a drive device for moving the pressure element between the activation position and the deactivation position, wherein the drive device comprises a first gearwheel which is connected to the pivot axis for rotation therewith and is in engagement with a second gearwheel which is connected to the pressure element for rotation therewith.

10. The passenger seat as claimed in claim 8, wherein the gear mechanism furthermore comprises a drive device for moving the pressure element between the activation position and the deactivation position, wherein the drive device comprises a cable pull which is connected to the pressure element and is configured to apply a tensile force to the pressure element to move the pressure element from the activation position into the deactivation position.

11. The passenger seat as claimed in claim 7, wherein the gear mechanism comprises an actuating lever which is movable between an activation position, in which the actuating lever applies a force to an extension element configured as a pivot element, which is pivotable about a further pivot axis, to hold the extension element in the use position, and a deactivation position, in which the actuating lever permits or induces a pivoting of the extension element into the inoperative position.

12. The passenger seat as claimed in claim 11, wherein the actuating lever is connected via a kinematic element, which is rotatable about an axis of rotation, to a further lever, which is fastened to the seat element in such a manner that a pivoting movement of the seat element about the pivot axis is transmitted via the further lever and the kinematic element to the actuating lever to move the actuating lever between the activation position and the deactivation position.

13. The passenger seat as claimed in claim 7, wherein the gear mechanism comprises a lever arrangement which is movable between an activation position, in which the lever arrangement applies a force to an extension element, which is configured in the form of a telescopic element which is displaceable telescopically relative to the second portion of the seat element, to hold the extension element in the use position, and a deactivation position, in which the lever arrangement permits or induces a displacement of the extension element into the inoperative position.

14. The passenger seat as claimed in claim 13,
wherein the gear mechanism furthermore comprises a drive device for moving the lever arrangement between the activation position and the deactivation position,
wherein the drive device comprises a cable pull which is connected to the lever arrangement and is configured to apply a tensile force to the lever arrangement for moving the lever arrangement from the deactivation position into the activation position.

15. The passenger seat as claimed in claim 13,
wherein the gear mechanism furthermore comprises a drive device for moving the lever arrangement between the activation position and the deactivation position,
wherein the drive device comprises a cable pull which is connected to the lever arrangement,
wherein the lever arrangement comprises at least one lever, a first end of which is connected to the cable pull and a second end of which is connected to an actuating surface of the extension element.

16. The passenger seat as claimed in claim 1, which furthermore comprises:
a locking mechanism which is configured in order, in a locked state, to deactivate the enlargement mechanism, wherein the locking mechanism is configured in order, in a locked state, to prevent a pivoting movement of the seat element about a pivot axis.

17. The passenger seat as claimed in claim 1, which furthermore comprises an elastically deformable seat cushion arranged on the seat surface of the seat element.

18. A passenger cabin area, which comprises:
a main aisle which extends substantially parallel to a longitudinal axis of the passenger cabin area,
a transverse aisle branching off from the main aisle, and
at least one passenger seat as claimed in claim 1 which is arranged in the passenger cabin area adjacent to the transverse aisle in such a manner that the seat element of the passenger seat faces the transverse aisle.

* * * * *